March 21, 1939.   F. M. NORDLING   2,151,484
ROTARY MOTOR AND PUMP
Filed May 9, 1938   2 Sheets-Sheet 1
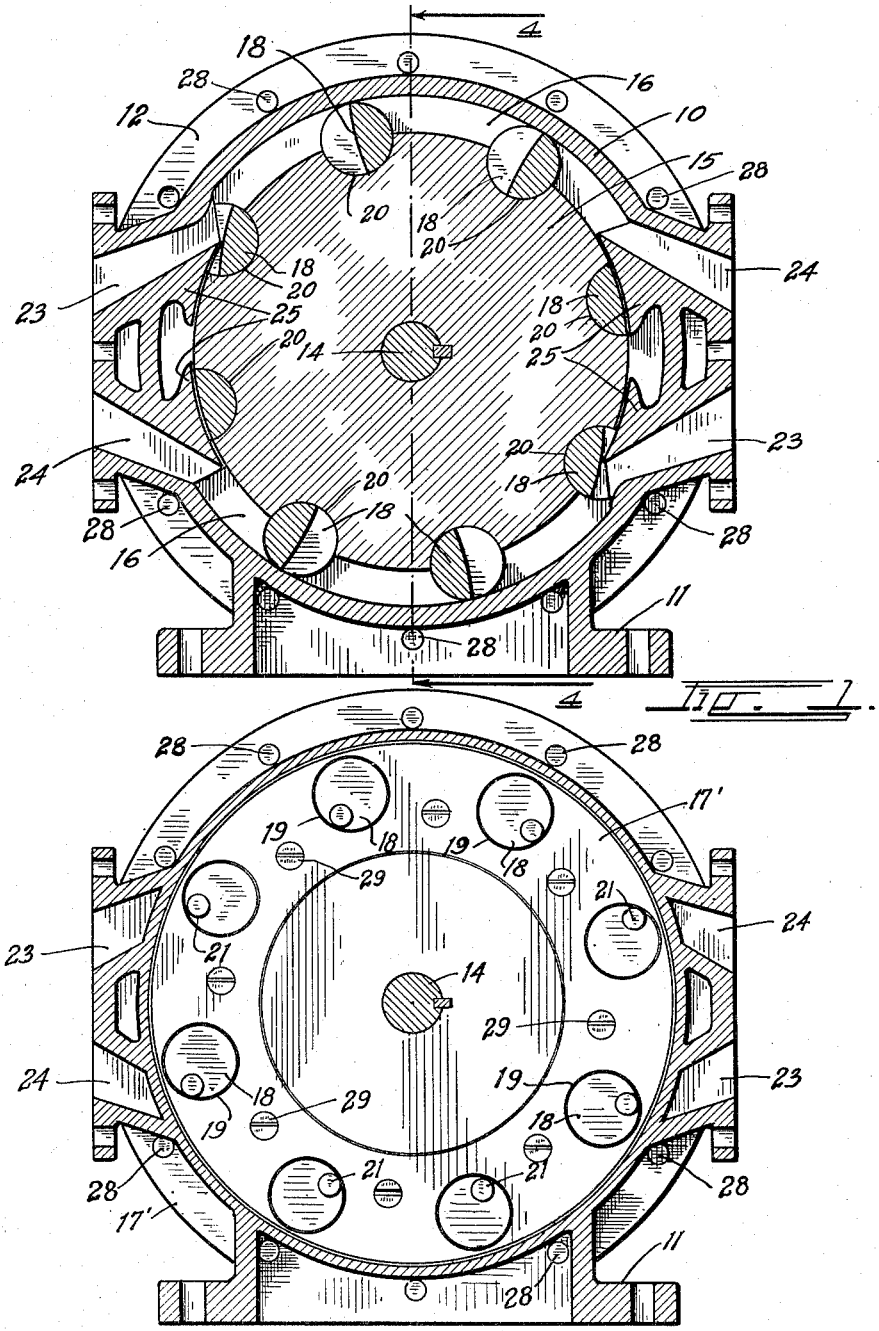
INVENTOR.
FRED M. NORDLING
BY
ATTORNEY.

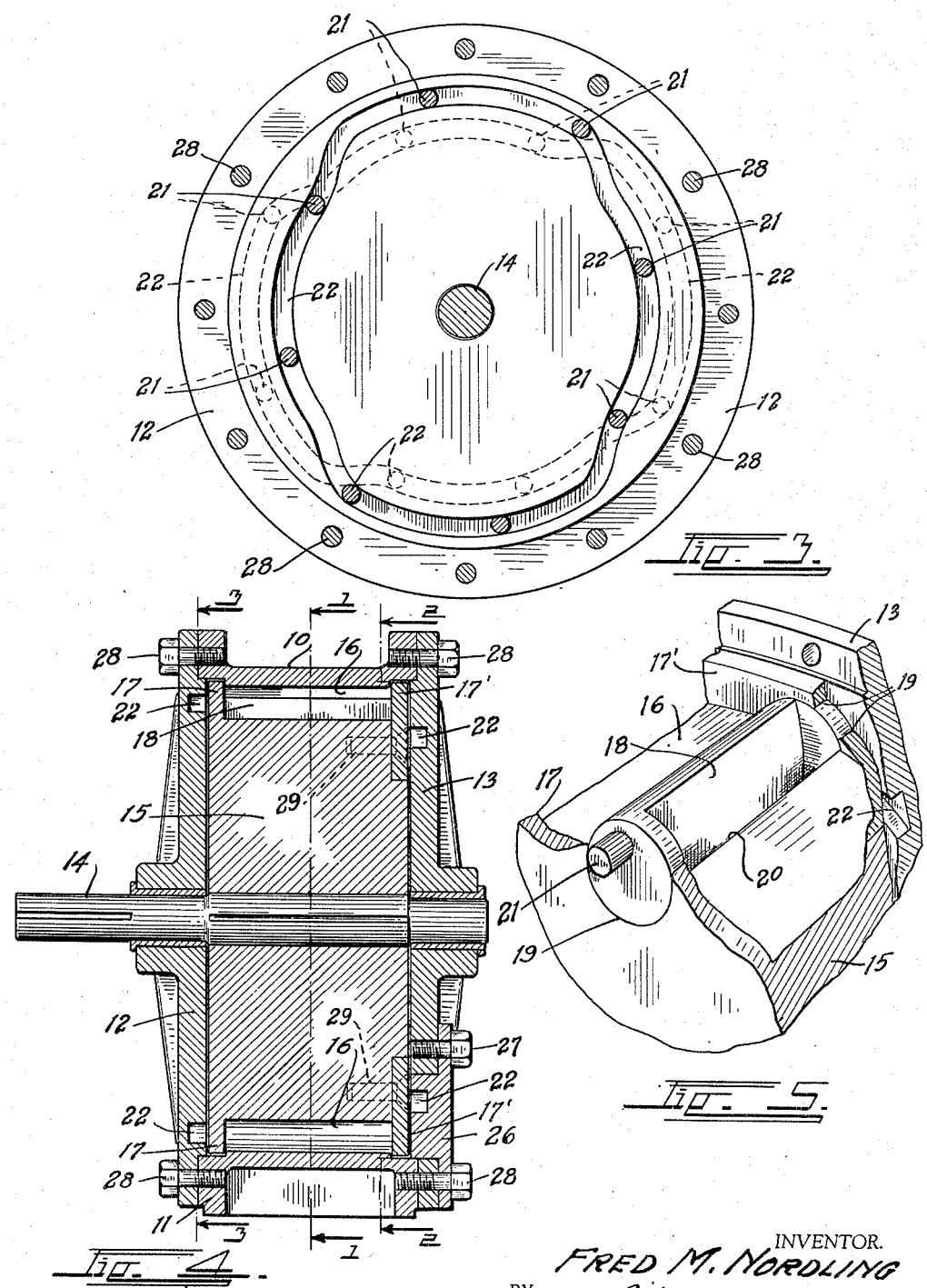

Patented Mar. 21, 1939

2,151,484

UNITED STATES PATENT OFFICE 2,151,484

ROTARY MOTOR AND PUMP

Fred M. Nordling, Denver, Colo.

Application May 9, 1938, Serial No. 206,857

3 Claims. (Cl. 121—92)

This invention relates to a rotary engine or pump. If the device is supplied with pressure from the exterior, such as with steam, air, or water, it will operate as an engine to deliver power. If driven from an outside source of power it will operate as a pump or compressor to pump air, water or other fluid.

The principal object of the invention is to provide a construction having a minimum of parts which will deliver a constant, smooth flow of power as an engine, or a constant, smooth flow of fluid as a pump.

Other objects of the invention are to eliminate all reciprocating parts and to employ in their stead rotary elements so as to eliminate uneven power delivery and vibration; and to provide a construction in which leakage past a piston or vane will be absorbed by another piston or vane so that the efficiency will not be seriously affected.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a vertical section through the improved engine or pump, taken on the line 1—1, Fig. 4.

Fig. 2 is a similar section, taken in the line 2—2, Fig. 4, illustrating a side view of the rotor.

Fig. 3 is a similar section, taken on the line 3—3, Fig. 4, illustrating the inner face of one of the face plates of the rotor housing. In this view the position of the cam groove in the opposite plate is illustrated in broken line.

Fig. 4 is a cross section taken on the line 4—4, Fig. 1.

Fig. 5 is a detail, perspective view illustrating one of the rotor vanes in position in the rotor.

The invention will be herein described for use as an engine, it being understood that it is equally valuable for use as a pulley or compressor.

The invention employs a cylindrical housing 10, preferably formed with a suitable supporting base 11. The faces of the housing 10 are closed by means of face plates 12 and 13, both of which are provided with suitable concentric bearings for mounting a rotor shaft 14 which projects through the face plate 13 to receive any suitable pulley.

A circular rotor 15 is keyed or otherwise secured to the shaft 14 within the housing 10.

The rotor 15 is preferably formed with a side flange 17 at one side and carries a flange ring 17', secured by means of suitable screws 29, at the other side which together form the sides of a peripheral channel 16. If desired both side flanges may be cast as an integral part of the rotor or both may be formed as removable rings as desired.

A series of laterally-positioned, semi-cylindrical vanes 18 extend across the channel 16. Each end of each vane is circular and the circular ends rotate in bearing openings 19 in the side flanges 17 and 17'. The vanes rest in laterally-extending, semi-cylindrical grooves 20 across the bottom of the channel 16. The housing 10 is grooved at each face for the reception of the side flanges 17 and 17'. The length of each vane corresponds to the width of the rotor so that their extremities will provide a smooth flush surface at each face of the rotor.

A stud 21 projects from each extremity of each vane. The studs in each vane are positioned diametrically opposite each other and each travels in a guide groove 22 formed in one of the face plates 12 and 13. Due to the opposite position of the pins 21, the guide grooves 22 do not correspond with each other in position but are arranged, as shown in Fig. 3, so as the rotor rotates one pin will be forced away from the axis while the other will be forced toward the axis to impart a 90° turn to the rotor.

The housing 10 is formed with one or more inlet ports 23 and a corresponding number of outlet ports 24 depending upon the size of the particular engine. As illustrated, there are two inlet ports 23 and two outlet ports 24. Each port has a lip 25 which projects inwardly into the channel 16 of the rotor into close proximity with the bottom of the channel. The guide grooves are arranged so that, as each vane 18 passes the lip 25 of an inlet port, it will be rotated 90° to place its flat face laterally of the channel 16 so as to close the channel and form a piston against which the incoming pressure acts. As each vane approaches the lip 25 of the outlet port 24, the guide grooves act to rotate the vanes back to their former position with the flat face 3 in alignment with the bottom of the channel 16, to allow the vanes to pass the lips.

It will be noted that there are a plurality of vanes in the pressure stream from each inlet to each outlet. The first vane receives the direct pressure from the inlet. The remaining vanes receive pressure due to any leakage which may occur past the proceeding vanes. This construction makes it unnecessary for the vanes to have an absolutely tight seal with the inner wall of the rotor housing since all pressure which would be lost by leakage is absorbed by the preceding vanes in the pressure stream.

The vanes are laterally slidable in the rotor so that they may be easily slid to or from place by simply removing one of the face plates 13. It is preferred to place a door section 26 in one of the face plates which may be bolted thereto by means of suitable bolts 27. This door section carries a continuation of the guide groove 22 and by simply removing the bolts 27 and rotating the rotor to bring the successive vanes into position opposite the door, the latter may be withdrawn and replaced without removing the face plates 12 and 13.

It can be readily seen that by applying power to the shaft 16 and rotating it in either direction the device will be caused to act as a pump to pass air or fluids from one set of ports to the opposite set of ports. As a pump it will operate in either direction but it is preferred to drive with the flat vane faces forward.

While the invention has been illustrated with four ports and with eight vanes, it is of course possible to build it in any size and with any desired number of ports and vanes around its periphery.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A rotor for rotary motors comprising: a cylindrical rotor member; a peripheral channel extending around the cylindrical face of said member with its bottom parallel to the axis of said rotor; semi-cylindrical grooves extending across said channel at spaced-apart intervals, said grooves terminating in circular bearing openings at each side of said channel; cylindrical vanes extending from side to side of said rotor through said bearing openings and lying in said grooves, the midportions of said vanes being cut away to correspond with the cross-sectional outline of said channel; and means for successively imparting partial rotation to said vanes to turn the flat sides thereof alternately first lateral of said channel thence flush with the bottom thereof.

2. A rotor for rotary motors comprising: a cylindrical rotor member; a peripheral channel extending around the cylindrical face of said member with its bottom parallel to the axis of said rotor; semi-cylindrical grooves extending across said channel at spaced-apart intervals, said grooves terminating in circular bearing openings at each side of said channel; cylindrical vanes extending from side to side of said rotor through said bearing openings and lying in said grooves, the midportions of said vanes being cut away to correspond with the cross-sectional outline of said channel; means for successively imparting partial rotation to said vanes to turn the flat sides thereof alternately first lateral of said channel thence flush with the bottom thereof; an intake port at one side of said rotor; an outlet port at the other side thereof; and a lip extending inwardly into the channel of said rotor adjacent each port.

3. In a rotary motor, of the type having a cylindrical housing closed at each face by means of a face plate having a concentric bearing and a concentric shaft supported in said bearings, a circular rotor block mounted on said shaft of a width to fit snugly between said face plates said rotor block being of less diameter than said housing; a peripheral flange at each side of said rotor extending outwardly the full diameter of said housing; said flanges fitting snugly against said face plates; cylindrical vane channels extending through both flanges and across said channel at spaced-apart intervals and being of uniform diameter throughout their length the axis of each channel lying in the plan of the circumference of said rotor; a cylindrical vane in each channel, said vanes equaling the width of said rotor in length so that their extremities will lie snugly against the inner faces of said face plates, said vanes being of uniform diameter throughout their lengths so that they may be withdrawn through said flanges and being cut away for one-half their diameter between said flanges; inlet and outlet passages opening through said housing to said channel; an abutment projecting inward from said housing and closing said channel between said inlet and outlet passages; an eccentrically positioned pin in each extremity of each vane; and an eccentric cam track in the inner face of each face plate for receiving said pins and acting to rotate said vanes as said rotor rotates.

FRED M. NORDLING.